Dec. 6, 1949     R. JARDINE     2,490,630
STORAGE BATTERY PLATE AND RETAINER CONSTRUCTION
Filed Oct. 3, 1944
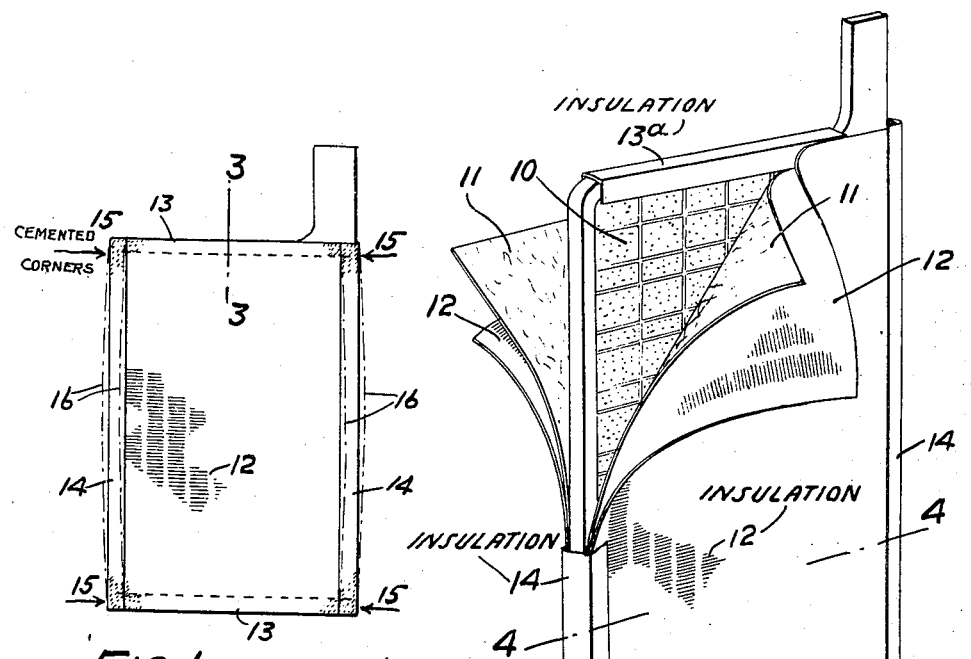
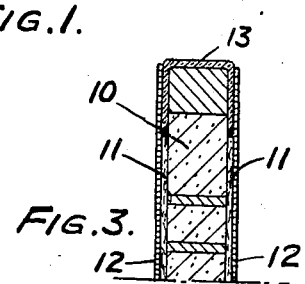
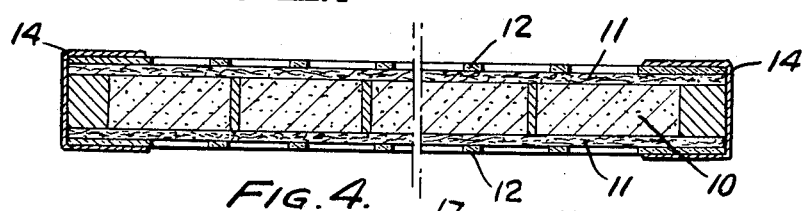
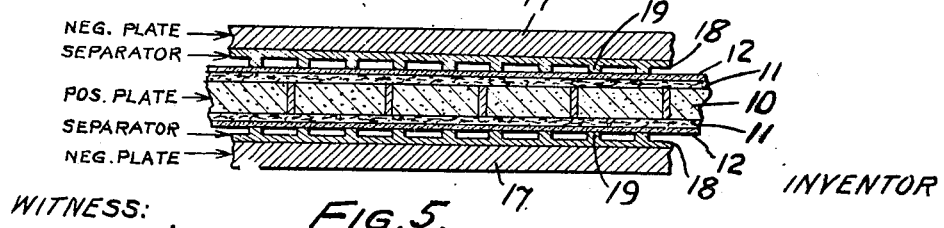
INVENTOR
Ray Jardine
BY Augustus B. Stoughton
ATTORNEY.
WITNESS:
Rob't R. Kitchel Patented Dec. 6, 1949

2,490,630

UNITED STATES PATENT OFFICE 2,490,630

STORAGE BATTERY PLATE AND RETAINER CONSTRUCTION

Ray Jardine, Glenside, Pa., assignor to The Electric Storage Battery Company, a corporation of New Jersey Application October 3, 1944, Serial No. 556,927

4 Claims. (Cl. 136—147)

This invention relates to a storage battery plate construction and has for its general object the provision of an improved insulated flat plate construction which is effective in use and can be manufactured and assembled at low cost.

A more specific object of this invention is the provision of a storage battery plate with suitable retainers permanently held in place over the plate surface by binding strips along the edges of the plate to produce a unitary structure capable of being readily handled and assembled in a storage battery.

A further object is to produce such a structure in which a positive pole plate is provided over its surface with a retainer comprising a porous sheet of fibrous inert material on which is superposed a perforated sheet of inert insulation, the sheets being held in place by channel shaped binding strips along the edges of the plate.

A further object is to provide, in a structure as above described, channel shaped insulating strips over the upper and lower margins of the plate applied directly to the plate itself, the retaining sheets extending over the plate surface and the upper and lower edges of the inner fibrous sheets abutting against the corresponding edges of the insulating strips.

A further object is to provide a structure as above described in which the vertical binding strips are cemented in place only at their upper and lower ends to provide for horizontal growth of the middle portion of the plate without disrupting the binding strip or the retaining sheets.

Other objects of the invention will appear from the following description of one embodiment thereof taken in connection with the accompanying drawing in which:

Figure 1 is a front elevation of the storage battery plate of this invention showing the finished plate assembly;

Figure 2 is an isometric view of the plate assembly shown in Figure 1 to an enlarged scale with the vertical binding strip along one edge cut away and the retaining sheets rolled back to show the construction more clearly;

Figure 3 is a partial vertical section to an enlarged scale on the line 3—3 of Figure 1;

Figure 4 is a horizontal section on the line 4—4 of Figure 2; and

Figure 5 is a partial horizontal section of a storage battery element showing the improved plate construction of this invention assembled with the other components of a storage battery element.

Referring to the drawing and particularly Figures 1 and 2, a battery plate 10 is shown which consists of the usual grid pasted with active material. In general the plate shown is intended as the positive plate of a storage battery element. Lying against the surfaces of this plate 10 is a retainer 11 consisting of a porous sheet of fibrous inert material, such as matted fibers of glass or synthetic resin. Overlying these sheets 11 are perforated sheets 12 of insulating material, such as hard rubber or a plastic such as polystyrene or the like. As here shown, the perforations are in the form of slots.

Channel shaped insulating strips 13a and 13b are applied to the upper and lower margins respectively of the plate. These may be of hard rubber or a plastic such as polystyrene or the like, and serve to prevent short circuits in the cell due to dislodged active material bridging across between the plates. Moreover, the insulating strip 13b along the lower margin of the plate enables placing the positive and negative plates on the same support bridges usually provided in the battery jar without risk of sediment shorts along the tops of such bridges. It will be noted from Figures 2 and 3 that the fibrous sheet 11 abuts against the edges of the insulating strips 13, so that the outer vertical surfaces of the sheet and the strips are approximately in the same plane while the perforated sheet 12 overlies both surfaces and covers any gap between them.

Channel shaped binding strips 14 of non-conducting material such as oriented polystyrene are applied to the vertical edges of the plate, including the vertical edges of the sheets 11 and 12, serving to hold the latter in place. These binding strips are cemented in position only at their upper and lower ends as indicated at 15 in Figure 1. Thus, if in service, the middle portion of the plate should expand slightly in a horizontal direction, as indicated by the dotted lines 16 in Figure 1, the binding strips 14 can slide over the surface of the sheet 12, thus avoiding any danger of rupture of the strip or the sheet. Moreover it will be noted that in the plate structure above described and illustrated the exposed vertical surfaces are flat and smooth and devoid of any horizontal projections or ledges which might collect sediment and cause short circuits.

While a single embodiment of this invention has been described in detail, modifications will occur to those skilled in the art and it is intended in the appended claims to cover all modifications which come within the true spirit and scope of this invention.

There is thus provided a unitary structure comprising the positive plate proper, 10, the retainer sheets 11 and 12, the insulating strips 13 and the binding strips 14. In Figure 5 of this unitary structure is shown assembled in a storage battery element having negative plates, 17, and interposed grooved separators 18 of either wood or microporous rubber. The ribs 19 of the separators, when thus assembled, hold the sheets 11 and 12 firmly against the surface of the positive plate 10 to oppose effectively the dislodgement of active material in service.

There is thus provided a unitary insulated battery plate construction which can be readily assembled and which, when assembled and combined with other components of the battery element, will produce a storage battery capable of giving long service and life without failure due to loss of material or splitting or other damage to the protecting insulating material.

I claim:

1. In a unitary storage battery plate and retainer structure, the combination of a plate, channel shaped insulating strips applied to the upper and lower marginal portions of the plate, porous sheets of fibrous inert material over the surfaces of the plate between the insulating strips and having their horizontal edges abutting the corresponding edges of the insulating strips, a sheet of perforated insulating material overlying the fibrous sheet and the vertical faces of the insulating strips, and channel shaped binding strips embracing the vertical margins of the plate and of the fibrous and perforated sheets.

2. In a unitary storage battery plate and retainer structure, the combination of a plate, channel shaped insulating strips applied to the upper and lower marginal portions of the plate, porous sheets of fibrous inert material over the surfaces of the plate between the insulating strips and having their horizontal edges abutting the corresponding edges of the insulating strips, a sheet of perforated insulating material overlying the fibrous sheet and the vertical faces of the insulating strips, and channel shaped binding strips embracing the vertical margins of the plate and of the fibrous and perforated sheets, said binding strips cemented in place at their upper and lower ends only.

3. In combination, a positive storage battery plate, porous retaining sheets of fibrous inert material applied to the opposite faces of the plate, perforated sheets of insulating material applied to the exposed surfaces of the fibrous sheets, channel shaped binding strips of insulating material gripping the vertical marginal edges of the plate and the sheets to bind them into a unitary structure adapted to be handled and assembled in a battery, and means securing said binding strips in place at only the upper and lower ends of the strips.

4. The combination in a storage battery element of the unitary positive plate and retainer structure of claim 3 assembled with a negative plate on either side and a grooved separator between the positive plate structure and the negative plate on either side.

RAY JARDINE.

REFERENCES CITED

The following references are of record in the file of this patent:

UNITED STATES PATENTS

| Number | Name | Date |
| --- | --- | --- |
| 1,055,366 | Stern | Mar. 11, 1913 |
| 1,088,210 | Davis | Feb. 24, 1914 |
| 1,641,842 | Fletcher | Sept. 6, 1927 |
| 1,937,405 | Entz et al. | Nov. 28, 1933 |
| 1,966,237 | Dinin | July 10, 1934 |
| 2,014,390 | Lunn | Sept. 17, 1935 |